(12) United States Patent
Anderson et al.

(10) Patent No.: US 6,899,503 B2
(45) Date of Patent: May 31, 2005

(54) INTERNALLY THREADED FASTENER AND STEMMED WASHER ASSEMBLY AND METHOD FOR MAKING SAME

(75) Inventors: Jeffrey D. Anderson, South Elgin, IL (US); Kent D. Homfeldt, Elgin, IL (US); Michael E. Ward, Geneva, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/871,127

(22) Filed: May 31, 2001

(65) Prior Publication Data

US 2002/0182031 A1 Dec. 5, 2002

(51) Int. Cl.[7] ............................................... F16B 43/00
(52) U.S. Cl. .................. 411/533; 411/368; 411/432; 411/338
(58) Field of Search ............................ 411/533, 366.1, 411/367, 368, 180, 183, 338, 339, 353, 999, 427, 432, 968, 969, 546

(56) References Cited

U.S. PATENT DOCUMENTS

| | | | |
|---|---|---|---|
| 405,227 A | 6/1889 | Schaubel | 411/367 |
| 2,779,375 A * | 1/1957 | O'Connor | 411/134 |
| 3,218,906 A | 11/1965 | Dupree | |
| 3,386,771 A | 6/1968 | Verdier et al. | 301/9 |
| 3,765,078 A | 10/1973 | Gulistan | |
| 3,829,163 A * | 8/1974 | Hans | 301/35.632 |
| 4,193,434 A | 3/1980 | Wagner | 151/38 |
| 4,435,112 A | 3/1984 | Becker | 411/368 |
| 4,587,377 A | 5/1986 | Rodseth | 174/16 HS |
| 4,900,209 A * | 2/1990 | Reynolds | 411/112 |
| 4,969,788 A * | 11/1990 | Goiny | 411/428 |
| 4,971,498 A | 11/1990 | Goforthe | |
| 5,020,951 A * | 6/1991 | Smith | 411/107 |
| 5,380,136 A * | 1/1995 | Copple et al. | 411/104 |
| 5,468,104 A * | 11/1995 | Reid et al. | 411/113 |
| 5,528,812 A * | 6/1996 | Muller | 29/432.2 |
| 5,584,628 A * | 12/1996 | Bernoni | 411/84 |
| 5,662,444 A | 9/1997 | Schmidt, Jr. | 411/369 |
| 5,688,091 A * | 11/1997 | McKinlay | 411/136 |
| 5,807,052 A | 9/1998 | Van Boven et al. | 411/353 |
| 5,934,851 A * | 8/1999 | Stewart et al. | 411/113 |
| 6,030,161 A | 2/2000 | Udell et al. | 411/353 |
| 6,102,610 A | 8/2000 | Palusis et al. | 403/388 |
| 6,435,791 B1 * | 8/2002 | Bydalek | 411/428 |
| 6,543,979 B2 | 4/2003 | Iwatsuki | 411/180 |
| 2002/0182031 A1 | 12/2002 | Anderson et al. | 411/533 |

FOREIGN PATENT DOCUMENTS

| | | | |
|---|---|---|---|
| EP | 0 004 185 A1 | 9/1979 | |
| GB | 2109079 A * | 5/1983 | F16B/37/00 |

* cited by examiner

*Primary Examiner*—William L. Miller
(74) *Attorney, Agent, or Firm*—Fletcher Yoder

(57) ABSTRACT

An assembly of an internally threaded fastener and a stemmed washer is provided, such as for applications in which a standoff is desired between a washer and a mating externally threaded fastener. The stemmed washer includes a washer portion, a retaining portion and a standoff portion. The retaining portion interfaces with the internally threaded fastener to retain the fastener in the assembly. The stemmed washer may include a skirt which is plastically deformed to capture the fastener. The fastener may include a skirt which similarly plastically to mate with a retaining lip on the stemmed washer. The fastener and washer may be secured in the assembly to permit relative rotation of the fastener with respect to the washer.

14 Claims, 3 Drawing Sheets

INTERNALLY THREADED FASTENER AND STEMMED WASHER ASSEMBLY AND METHOD FOR MAKING SAME

BACKGROUND OF THE INVENTION

The present invention relates generally to the field of threaded fasteners, and more particularly to an internally threaded fastener, such as a threaded nut, joined in an assembly with a stemmed washer. The invention also relates to a manner for retaining an internally threaded fastener and such an assembly, and to a method for making the assembly.

A variety of applications are known for threaded fasteners used with standoffs. In a number of applications wherein one or more compressible materials are to be secured, for example, a standoff is commonly inserted into an aperture in the compressible material, and threaded or other fasteners are placed through the standoff for securing the compressible material in a desired position. Compressible materials on which standoffs are commonly used include various plastics, rubbers, foam materials, and so forth, but may also include expanded metals, cellulosic products, and so forth. Moreover, standoffs are also commonly used in applications wherein penetration of one or more fasteners is to be limited, although the material being fastened in place is not necessarily particularly compressible, such as in fragile or brittle materials.

Where applications call for the use of mechanical standoffs, prior art arrangements have typically relied upon separate components which are brought together in place to permit securing without crushing compressible materials, or while maintaining a desired distance between mechanical components, typically a screw or bolt and a nut. Thus, in a traditional assembly, a standoff is placed in the receiving aperture, a screw or bolt is passed through the aperture and standoff, and a traditional washer and nut are secured on the opposite side. While such arrangements provide generally adequate resistance to crushing and maintain desired mechanical distances between the joined fasteners, they require several separate parts and can entail considerable assembly time for insertion of the standoff, and assembly of the fasteners. Moreover, the various separate parts must be individually manufactured, shipped, stored and brought together in the final assembly.

There is a need, therefore, for an improved arrangement for securing fasteners to one another in applications requiring standoffs. There is a particular need for a technique which would facilitate assembly, while providing a high degree of resistance to crushing, and which would maintain desired distance between elements of the threaded assembly.

SUMMARY OF THE INVENTION

The present technique provides an assembly of an internally threaded fastener with a stemmed washer designed to respond to such needs. The washer may include a generally planar section which is designed to fit against an element being fastened in a manner of a conventional washer, and a standoff section extending from the planar section. The standoff and washer are hollow, thereby permitting a fastener, such as a screw or bolt, to be inserted therethrough. The washer can be dimensioned such that sufficient distribution of load is maintained to avoid damage to the elements being fastened. The standoff can be made any suitable length, and may be tailored to specific applications, depending upon the desired thickness or final dimensions of the elements being fastened.

The threaded fastener assembled with the stemmed washer may be any suitable type, such as a flanged nut. In the latter case, the nut presents a flange around a lower peripheral edge that can be captured in a section of the washer. In one embodiment, an upstanding skirt on the washer is bent inwardly to capture a flange on a nut to maintain the nut in the assembly, while allowing the nut to rotate freely with respect to the washer. The entire assembly may be manufactured in a straightforward and cost-effective manner. In one exemplary method, for example, the washer and standoff element is made by a stamping process, with an open skirt extending upwardly from the washer portion. A flanged nut is then placed over the washer and the skirt is crimped or otherwise deformed to close the skirt slightly around the flange of the nut to complete the assembly and retain the nut in place, while allowing its free rotation.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
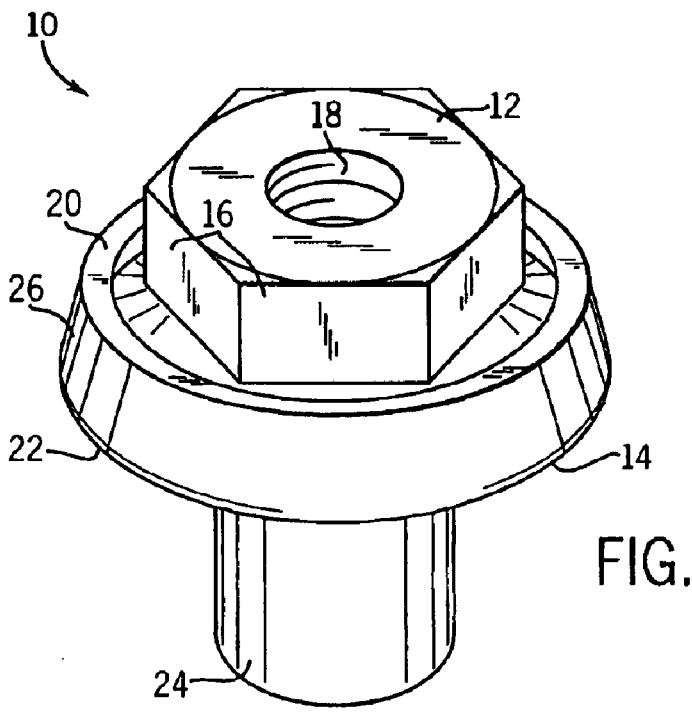
FIG. 1 is a perspective view of a fastener and stemmed washer assembly in accordance with certain aspects of the present technique.

Turning now to the drawings and referring first to FIG. 1, an assembly is illustrated in accordance with the present technique and designated generally by reference numeral 10. The assembly includes an internally threaded fastener 12 secured to a stemmed washer 14. In the illustrated embodiment the fastener 12 is a hex nut having hex flats 16 for interfacing with a conventional wrench. Internal threads 18 are provided for interfacing with a mating threaded fastener as described in greater detail below. A peripheral flange 20 is formed around a base of fastener 12 to interface with a corresponding portion of the stemmed washer to maintain the fastener in the assembly and to permit free spinning of the fastener for securement in an application.

The stemmed washer 14 includes features which serve both as a conventional washer, as a standoff, and as a retaining structure for the fastener 12. In the illustrated embodiment, the stemmed washer 14 thus includes a generally planar washer portion 22 integrally formed with a standoff portion 24. Standoff portion 24 is generally right cylindrical in shape in the illustrated embodiment, although other overall shapes (e.g., tapered) may be employed. Moreover, the shape and contour of the washer portion 22 may be adapted for various purposes, and may deviate from the planar shape illustrated. The retaining portion 26 extends upwardly from the washer portion 22 and extends inwardly slightly over the flange 20 of the fastener to retain the fastener within the assembly. In a present embodiment, the retaining portion 26 fits loosely around the flange 26 to permit free spinning movement of the fastener within the assembly.

Figure 2:
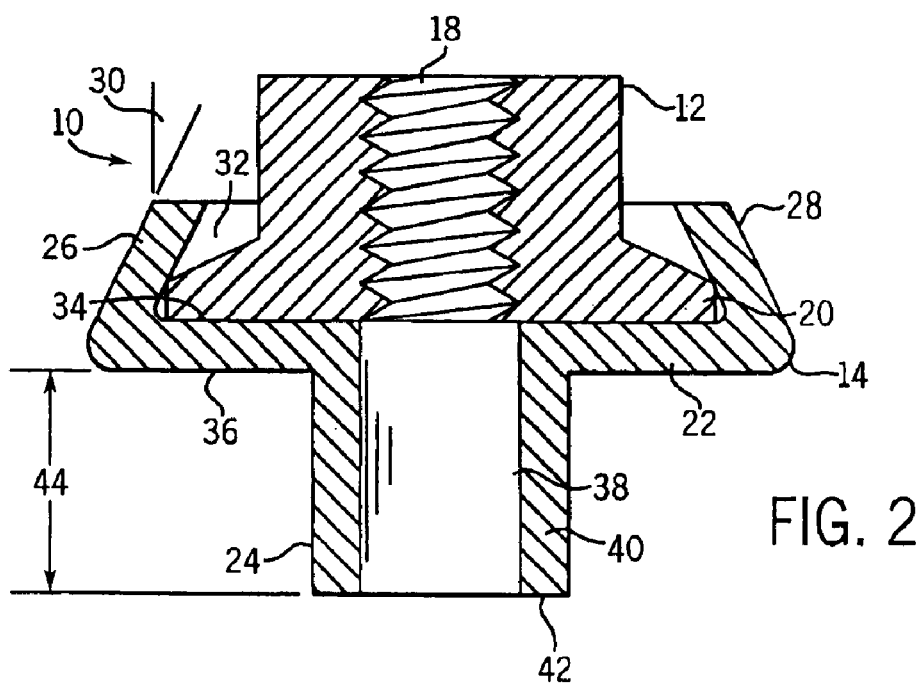
FIG. 2 is a sectional view through the assembly of FIG. 1 illustrating an exemplary configuration of the internally threaded fastener and stemmed washer.

Referring to FIG. 2, the assembly of FIG. 1 is illustrated in cross-section. As noted above, the assembly 10 includes a fastener 12 and a stemmed washer 14. The stemmed washer includes a washer portion 22, a lower standoff portion 24, and a retaining portion 26. In the illustrated embodiment, the retaining portion 26 generally forms an upstanding skirt 28 bent inwardly towards the fastener 12 so as to retain the fastener by interference with the flange 20 provided at the lower extremity of the fastener. While the upstanding skirt 28 may have any suitable shape and contour, in the illustrated embodiment the skirt is angled inwardly slightly through an angle 30 to form a cavity 32 in which the fastener is retained. The fastener thus rests upon a base 34 of the cavity 32 and exerts force against the base when drawn into engagement with a mating fastener. The washer portion 22 presents an abutment surface 36 at its lower face opposite the base 34 for contacting an element to be secured in place. Below the abutment surface 36, the standoff portion 34 has an aperture 38 extending therethrough for receiving a mating fastener as described below. Aperture 38 is surrounded by side walls 40, which is noted above, may be straight cylindrical in shape as illustrated, or may be contoured, flared, or otherwise bent or ridged. A lower abutment end 42 of the standoff portion 24 serves to contact a mating surface, such as of a mating fastener as described below.

Various lengths of the standoff portion 24 may be provided, as illustrated at reference numeral 44 in FIG. 2. In the illustrated embodiment, the dimension 44 extends between the abutment surface 36 and the abutment end 42, thereby defining a final dimension between which elements to be secured in place are disposed. Thus, the length of dimensions 44 will generally correspond to a desired distance between an upper location of an element to be secured in place, and a lower location of a mating component, such as a fastener.

Figure 3:
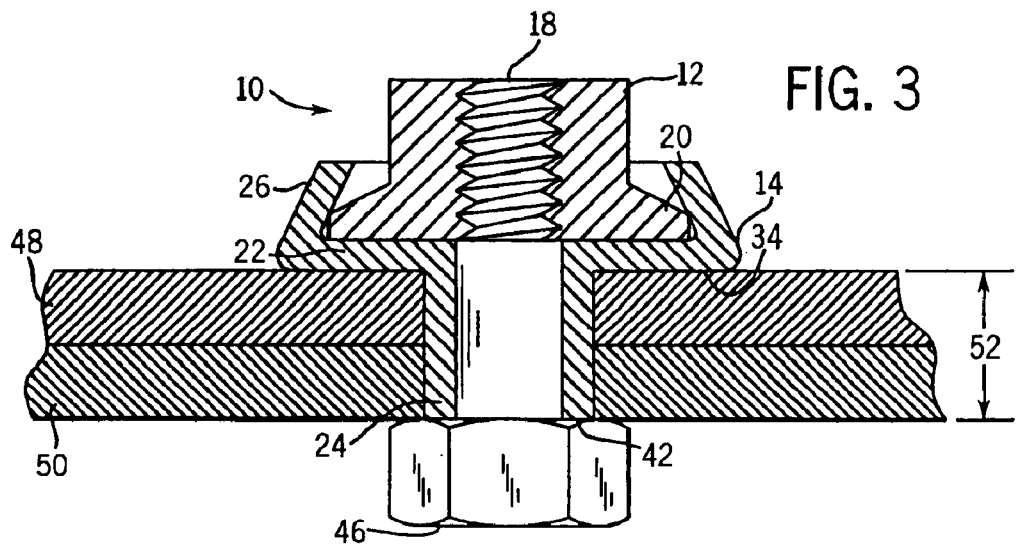
FIG. 3 is a sectional view of the assembly illustrated in FIGS. 1 and 2, installed with a mating fastener to maintain elements in the desired location within a final assembly.

The assembly of FIGS. 1 and 2 is illustrated in an application in FIG. 3. As shown in FIG. 3, the assembly 10 is designed to cooperate with a mating fastener 46, such as a screw or bolt, which is received within the internally threaded fastener 12 of the assembly. In practice, the assembly 10 may be simply inserted into apertures formed within elements to be secured to one another, such as element 48 and element 50 in the illustrated embodiment of FIG. 3, and the mating fastener 46 inserted from an opposite side. The fastener 46, and/or the fastener 12 may then be rotated to join the assembly 10 to the fastener 46, with the elements 48 and 50 lodged therebetween. In the illustrated embodiment the fastener 12 is free to rotate within assembly 10 as described above. In certain applications, however, the fastener may be fixed with respect to the retaining stemmed washer, such that only fastener 46 is rotated for securement.

The final assembly presents a spacing or dimension 52 between the abutment surface 36 and abutment end 42 of the stemmed washer 14. In general, the dimension 52 will be equivalent to dimension 44 illustrated in FIG. 2. It should be noted that the final dimension may provide for loose attachment of the elements to one another, or slight crushing or compression of one or both elements. The arrangement is thus particularly well suited to fastening components which may be damaged or deformed in use, such as plastics, rubbers, expanded metals, and so forth. The arrangement is also particularly well suited to fastening components for which dimensions should be maintained or over-pressure should be avoided, such as metal, glass, and other harder and dimensionally stable components.

Figure 4:
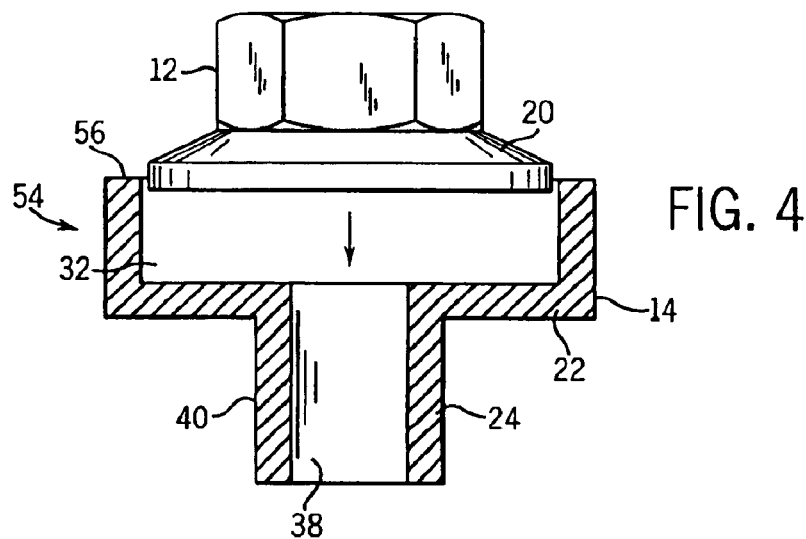
FIGS. 4 and 5 are sectional views of the assembly of FIGS. 1 and 2 showing steps in progressive manufacture of the assembly for retaining the threaded fastener within the stemmed washer.
Figure 5:
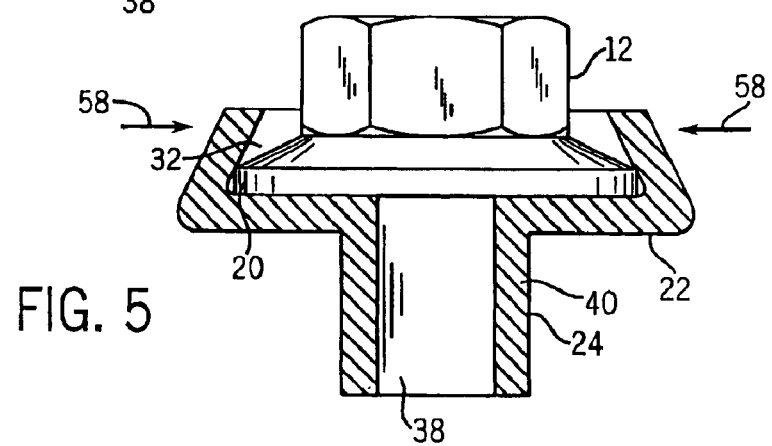

FIGS. 4 and 5 illustrate progressive manufacturing assembly of the elements described above. In a present embodiment, the stemmed washer 14 is formed, such as by a drawing or stamping operation, to form a blank 54. The blank 54 presents the standoff portion 24 and integral washer portion 22, with the washer portion 22 presenting a generally upstanding open skirt 54 defining cavity 32. The internally threaded fastener 12 is then placed within the cavity 32 as illustrated in FIG. 4. With the fastener thus in place, the open skirt 56 of FIG. 4 is bent inwardly, such as in a crimping operation, as illustrated by arrows 58 in FIG. 5. As noted above, while this operation may secure the fastener rigidly within the assembly to prevent rotation, in a presently preferred configuration, the fastener 12 may freely spin within the cavity 32 to allow securement to a mating fastener, while the stemmed washer remains stationary.

Figure 6:
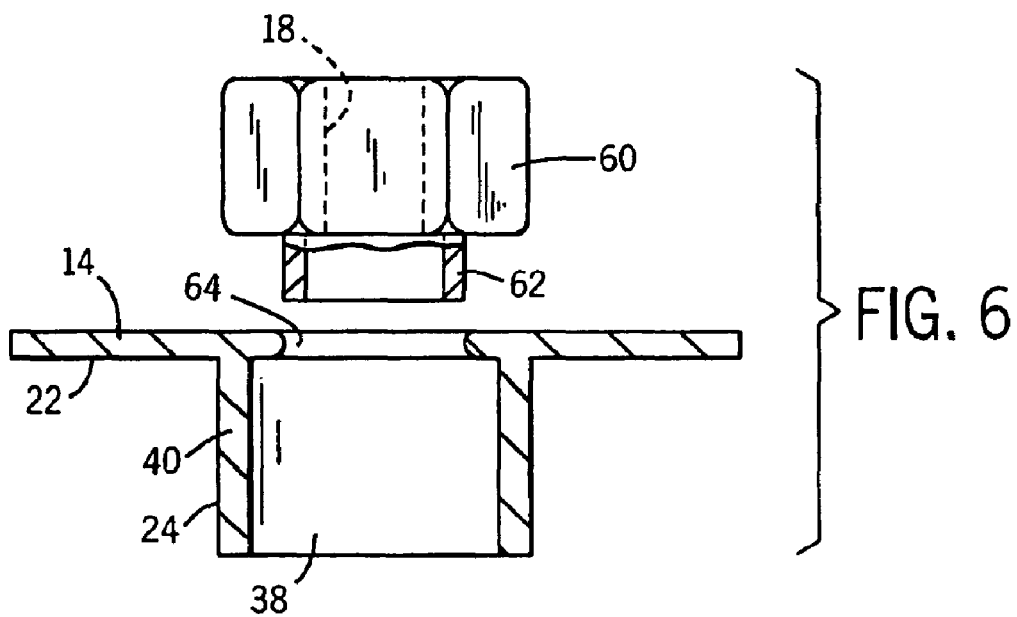
FIGS. 6 and 7 illustrate in partial section an alternative configuration of a threaded fastener secured to a stemmed washer in accordance with aspects of the present technique.
Figure 7:
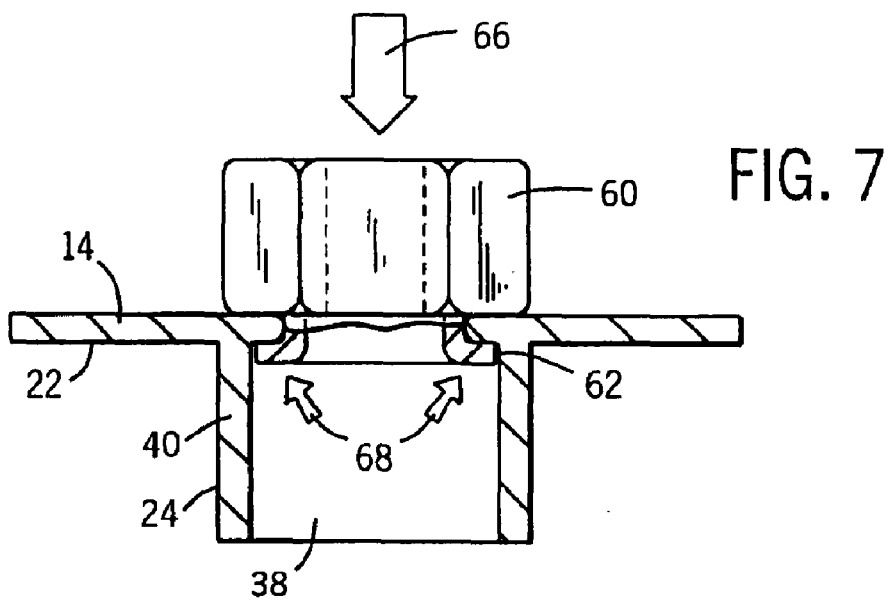

FIGS. 6 and 7 illustrate an alternative configuration of an internally threaded fastener secured to a stemmed washer. In the embodiment of FIGS. 6 and 7, an alternative threaded fastener 60 includes internal thread 18 as in the previous embodiments, but further includes a lower skirt or extension 62. Skirt 62 may be formed by any suitable process, such as during the initial fabrication of the fastener. Extension 62 forms a generally cylindrical skirt extending downwardly from the threaded fastener. Various configurations for the skirt may be envisaged. For example, the skirt may be continuous, extending in an uninterrupted cylinder around the base of the fastener, or may be discontinued, forming tabs or individual extension feet around the fastener. The stemmed washer 14 in this embodiment includes a radially-projecting internal ridge 64 designed and dimensioned to receive the skirt 62 of the fastener.

As the assembly is brought together, as illustrated in FIG. 7, the internally threaded fastener 60 is lowered into the aperture formed by the ridge 64, as illustrated by arrow 66. The skirt is then deformed plastically, such as through a crimping or flaring operation, as illustrated by arrows 68, to secure the skirt within the stemmed washer. In the illustrated embodiment, skirt 62 is deformed so as to provide for free rotation of the fastener within the stemmed washer. Alternatively, the deforming operation performed on the skirt may be such as to fixedly secure the nut with relation to the stemmed washer to prevent their mutual rotation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An internally threaded fastener assembly comprising:
a stemmed washer having a washer portion with an abutment surface adapted to abut a surface of a material, a standoff portion integral with the washer portion and configured to extend substantially through the material of a defined thickness, and a retaining portion integral with the washer portion wherein the standoff portion extends from the washer portion and has an exterior surface that is substantially perpendicular to the washer portion; and an internally threaded fastener disposed adjacent to the washer portion and retained rotatably within assembly with the stemmed washer by the retaining portion, wherein the internally threaded fastener is adapted to engage an externally threaded fastener having a shaft insertable through the standoff portion and having a head abuttable against an end of the standoff portion opposite the washer portion, such that the standoff portion limits compressive loading by the internally and externally threaded fasteners on the material therebetween.

2. The assembly of claim 1, wherein the fastener includes a peripheral flange and the retaining portion extends radially inwardly to capture the peripheral flange and thereby to retain the fastener in the assembly.

3. The assembly of claim 1, wherein the standoff portion forms a hollow right cylinder.

4. The assembly of claim 1, wherein the washer portion is generally planar.

5. The assembly of claim 1, wherein the fastener is a threaded nut having flats extending from the stemmed washer.

6. An internally threaded fastener assembly comprising:
a threaded nut having a lower peripheral flange; and
a base having a washer portion having a material abutment surface, a standoff portion having a substantially cylindrical structure extending from the washer portion to an end, and a retaining skirt portion extending integrally from the washer portion and capturing the peripheral flange of the threaded nut to retain the threaded nut rotatably in assembly with the base, wherein the standoff portion is adapted to receive a shali of a threaded fastener securable to the threaded nut such that a portion of the threaded fastener abuts the end of the standoff portion to substantially limit compressive loading on a material.

7.The assembly of claim 6, wherein the nut includes flats extending from the retain skirt portion.

8. The assembly of claim 6, wherein the standoff portion, the washer portion and the retaining skirt portion form a single-piece structure.

9. The assembly of claim 6, wherein the washer portion is generally planar.

10. The assembly of claim 6, wherein the standoff portion forms a hollow right cylinder.

11. An internally threaded fastener assembly comprising:
an internally threaded fastener adapted to engage an externally threaded fastener; and
a base having a washer portion with an abutment surface adapted to abut an outer surface of a material, a standoff portion adapted to extend from the washer portion such that the standoff portion extends substantially through the material to an abutment end of the standoff adapted to limit displacement of the externally threaded fastener relative to the washer portion, and a retaining skirt portion extending integrally from the washer portion and capturing the internally threaded fastener rotatably in assembly with the base wherein the standoff portion has an exterior surface that is substantially perpendicular to the washer portion.

12. The assembly of claim 11, wherein the fastener includes a peripheral flange extending radially therefrom, and wherein the skirt portion captures the peripheral flange to retain the fastener in assembly with the base.

13. A fastener kit comprising:
a stemmed washer having a washer portion with an abutment surface adapted to abut a material, a standoff portion integral with the washer portion and comprising a substantially right cylinder extending from the washer portion to an end opposite the washer portion, and a retaining portion integral with the washer portion;
an internally threaded fastener disposed adjacent to the washer portion and retained rotatably within assembly with the stemmed washer by the retaining portion; and
an externally threaded fastener which mates with the internally threaded fastener,
wherein the end of the standoff portion is adapted to limit relative displacement of the externally threaded fastener and the washer portion of the stemmed washer to minimize compression by the internally and externally threaded fasteners on the material disposed therebetween.

14. A fastened joint comprising:
a stemmed washer having a washer portion adapted to abut a compressible substrate, a standoff portion integral with the washer portion, and comprising a substantially right cylinder extending from the washer portion to an end opposite the washer portion, and a retaining portion integral with the washer portion;
an internally threaded fastener disposed adjacent to the washer portion and retained rotatably within assembly with the stemmed washer by the retaining portion;
an externally threaded fastener having a threaded shaft which mates with the internally threaded fastener, the externally threaded fastener including a head which abuts the end of the standoff portion; and
the compressible substrate joined between the standoff portion and the head of the externally threaded fastener, wherein the standoff portion is adapted to limit compression of the substrate between the head of the externally threaded fastener and the washer portion of the stemmed washer.

* * * * *

UNITED STATES PATENT AND TRADEMARK OFFICE
CERTIFICATE OF CORRECTION

PATENT NO. : 6,899,503 B2  Page 1 of 1
APPLICATION NO. : 09/871127
DATED : May 31, 2005
INVENTOR(S) : Jeffrey D. Anderson et al.

It is certified that error appears in the above-identified patent and that said Letters Patent is hereby corrected as shown below:

On the title page item (75), the list of inventors reading "Jeffrey D. Anderson, South Elgin, IL (US); Kent D. Homfeldt, Elgin, IL (US); Michael E. Ward, Geneva, IL (US)" should read --Jeffrey D. Anderson, South Elgin, IL (US); Kent D. Homfeldt, Elgin, IL (US); Michael E. Ward, Geneva, IL (US); James P. Langford, Port Washington, WI (US)--.

Signed and Sealed this

Third Day of June, 2008

JON W. DUDAS
*Director of the United States Patent and Trademark Office*